(12) United States Patent
Corich

(10) Patent No.: US 12,171,337 B2
(45) Date of Patent: Dec. 24, 2024

(54) ARTICLES WITH ONE OR MORE VIEWABLE OBJECTS THEREIN

(71) Applicant: 33 3D Acrylics, LLC, Griffith, IN (US)

(72) Inventor: Sonja Ann Corich, Griffith, IN (US)

(73) Assignee: CORICH, LLC, Griffith, IN (US)

( * ) Notice: Subject to any disclaimer, the term of this patent is extended or adjusted under 35 U.S.C. 154(b) by 0 days.

(21) Appl. No.: 18/480,113

(22) Filed: Oct. 3, 2023

(65) Prior Publication Data

US 2024/0023710 A1 Jan. 25, 2024

Related U.S. Application Data

(63) Continuation of application No. 17/706,141, filed on Mar. 28, 2022, now Pat. No. 11,771,225.

(Continued)

(51) Int. Cl.
| | |
|---|---|
| A47B 96/20 | (2006.01) |
| A47B 96/02 | (2006.01) |
| A47B 96/06 | (2006.01) |
| B29C 39/10 | (2006.01) |
| G09F 3/20 | (2006.01) |
| B29L 31/44 | (2006.01) |

(52) U.S. Cl.
CPC .......... *A47B 96/201* (2013.01); *A47B 96/021* (2013.01); *A47B 96/066* (2013.01); *B29C 39/10* (2013.01); *G09F 3/20* (2013.01); *G09F 3/204* (2013.01); *B29K 2995/0026* (2013.01); *B29K 2995/0029* (2013.01); *B29L 2031/44* (2013.01)

(58) Field of Classification Search
CPC ... A47B 96/201; A47B 96/021; A47B 96/066; B29C 39/10; B29K 2995/0026; B29K 2995/0029; B29K 2033/12; B29L 2031/44; A47F 5/0068; A47F 11/06; B44C 5/005; G09F 3/20; G09F 3/204; A63H 33/08; A63H 33/082
See application file for complete search history.

(56) References Cited

U.S. PATENT DOCUMENTS 3,705,470 A * 12/1972 Kent ...................... B60J 10/70
                                                                    29/515
4,140,224 A *  2/1979 Celeste ................. A47F 5/0025
                                                                    40/661.03

(Continued)

OTHER PUBLICATIONS

Ruis De Elvira Serra, Antonio et al: document ID: ES-1103505-U "Modular Device as a Structural Architectural Envelope With Photobioreactor Function for the Production of Microalgae" (Date published Mar. 18, 2014) (Year: 2014).*

(Continued)

*Primary Examiner* — Ko H Chan
(74) *Attorney, Agent, or Firm* — Hartman Global IP Law; Gary M. Hartman; Domenica N. S. Hartman

(57) ABSTRACT

An article includes at least first and second members. A decorative object is within the second member. Interlocking features are adapted to removably interlock the first and second members together. The interlocking features include a channel and a rail that are complementarily shaped so that the rail is receivable within the channel to removably interlock the rail with the channel. At least the second member is formed of a translucent or transparent material so that the decorative object within the second member is visible through the member.

7 Claims, 3 Drawing Sheets

Related U.S. Application Data

(60) Provisional application No. 63/166,306, filed on Mar. 26, 2021.

(56) References Cited

U.S. PATENT DOCUMENTS

| | | | | |
|---|---|---|---|---|
| 4,223,052 | A * | 9/1980 | Tsuda | C08G 63/672 428/458 |
| 4,428,168 | A * | 1/1984 | Tomer | E04H 13/003 47/41.1 |
| 4,698,928 | A * | 10/1987 | Soporowski | G09F 7/08 40/607.13 |
| 4,898,355 | A * | 2/1990 | Steinway | A47B 96/062 248/248 |
| 6,145,232 | A * | 11/2000 | Bevins | G09F 3/204 40/661 |
| 7,340,855 | B2 * | 3/2008 | Wiltfang | G09F 3/204 40/658 |
| 7,833,077 | B1 * | 11/2010 | Simmons, Jr. | A63H 33/08 446/85 |
| 8,082,859 | B2 * | 12/2011 | Sevack | A47B 96/066 248/250 |
| 9,861,198 | B2 * | 1/2018 | Anderson | A47B 96/028 |
| 10,130,196 | B2 * | 11/2018 | Burns | A47F 1/12 |
| 10,575,641 | B1 * | 3/2020 | Severa | A47B 96/061 |
| 10,706,749 | B1 * | 7/2020 | White | G09F 3/204 |
| 2003/0137828 | A1 * | 7/2003 | Ter-Hovhannisian | A47F 3/0404 362/249.02 |
| 2004/0264160 | A1 * | 12/2004 | Bienick | F25D 27/00 362/23.15 |
| 2007/0023374 | A1 * | 2/2007 | Nawrocki | A47F 5/0846 211/90.01 |
| 2009/0224119 | A1 * | 9/2009 | Heffernan | A47B 96/066 248/220.21 |
| 2012/0106129 | A1 * | 5/2012 | Glovatsky | F25D 23/067 362/92 |
| 2019/0201570 | A1 * | 7/2019 | Dobrinsky | G01N 21/645 |
| 2019/0261788 | A1 * | 8/2019 | Ringel | F21S 8/033 |
| 2020/0329868 | A1 * | 10/2020 | Mølgaard | A47F 3/001 |

OTHER PUBLICATIONS

Keskes, document ID EP 2374958 A1: "Hollow Construction Element for Building or Civil Engineering Works of Art, Has Hole Formed at Thickness of Wall at Level of Bottom to Set in Communication With Two Adjacent Construction Elements During Assembling"; published Oct. 12, 2011 (Year: 2011).*

* cited by examiner

US 12,171,337 B2

ARTICLES WITH ONE OR MORE VIEWABLE OBJECTS THEREIN

CROSS-REFERENCE TO RELATED APPLICATIONS

This is a continuation patent application of co-pending U.S. patent application Ser. No. 17/706,141 filed Mar. 28, 2022, which claims the benefit of U.S. Provisional Application No. 63/166,306 filed Mar. 26, 2021. The contents of these prior patent documents are incorporated herein by reference.

BACKGROUND OF THE INVENTION

The present invention generally relates to articles adapted to display one or more objects recessed below one or more translucent or transparent surfaces of the article such that the objects are viewable through the surfaces and appear to float within the article.

BRIEF DESCRIPTION OF THE INVENTION

According to a nonlimiting aspect of the invention, an article includes first and second members. The first member has a front side defining a front surface of the first member. The second member has a back side and a front side, in which the back side of the second member defines a back surface of the second member and the front side of the second member defines a distal surface of the article. The article further includes a decorative object within the second member and interlocking features adapted to removably interlock the first and second members together. The interlocking features include a channel and a rail that are complementarily shaped so that the rail is receivable within the channel to removably interlock the rail with the channel. The interlocking features are disposed at the front side of the first member and the back surface of the second member. At least the second member is formed of a translucent or transparent material so that the decorative object within the second member is visible through the second member.

According to another nonlimiting aspect of the invention, a shelf is provided that includes first and second shelf members. Each of the first and second shelf members has a back side and a front side. The back side of the first shelf member defines a wall-mounting surface of the shelf, and the front side of the first shelf member defines a front surface of the first shelf member. The back side of the second shelf member defines a back surface of the second shelf member, and the front side of the second shelf member defining a distal surface of the shelf. A decorative object is within the second shelf member. Wall mounting hardware is disposed on the back side of the first shelf member for mounting the first shelf member to a support surface. The wall mounting hardware includes an anchor member that protrudes into the first shelf member through the wall-mounting surface of the first shelf member. Interlocking features are adapted to removably interlock the first and second shelf members together. The interlocking features include a channel and a rail that are complementarily shaped so that the rail is receivable within the channel to removably interlock the rail with the channel. The interlocking features are disposed at the front and back surfaces of the first and second shelf members, respectively, so that the distal surface of the shelf at the front side of the second shelf member is oppositely disposed from the wall-mounting surface of the shelf at the back side of the first shelf member when the rail and the channel are removably interlocked together. At least the second shelf member is formed of a translucent or transparent material so that the decorative object within the second shelf member is visible through the second shelf member.

According to another nonlimiting aspect of the invention, a method of forming the shelf includes placing a quantity of liquid polymer and a decorative object in a mold cavity so that the decorative object is entirely immersed in the liquid polymer, and curing the liquid polymer to form the second shelf member and so that the decorative object is completely embedded within the second shelf member.

Technical effects of a shelf having elements as described above preferably include the capability of selectively reconfiguring the shelf to display objects within the shelf that are viewable through one or more surfaces of the shelf.

Other aspects and advantages of this invention will be further appreciated from the following detailed description.

DETAILED DESCRIPTION OF THE INVENTION

Figure 1:
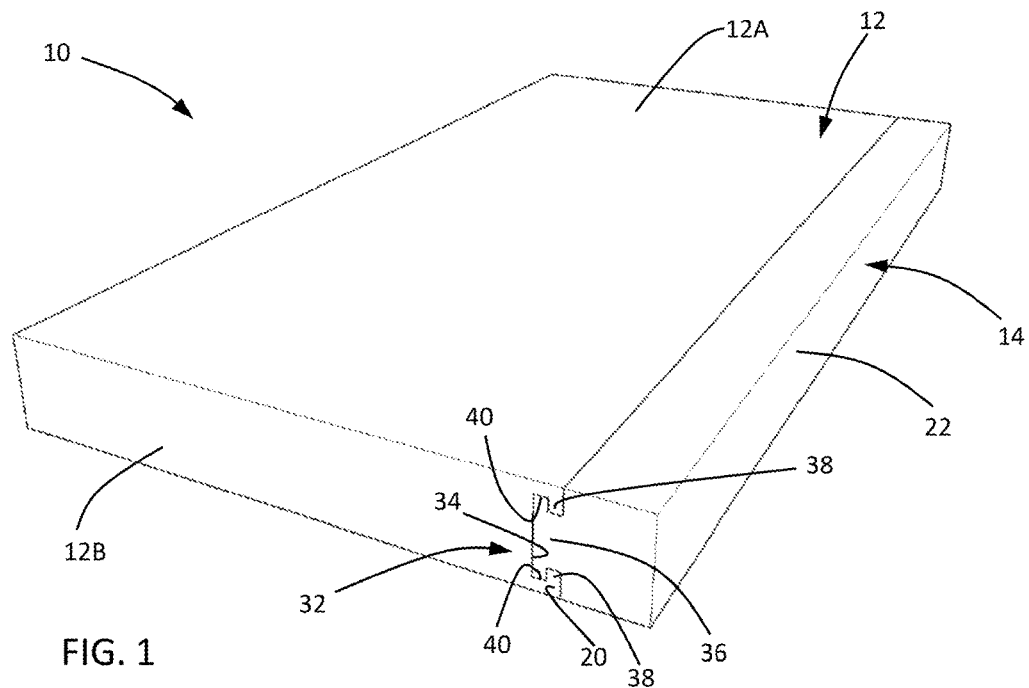
FIG. 1 schematic representation of a nonlimiting embodiment of a shelf in accordance with certain aspects of the invention, wherein surfaces of the shelf are opaque for illustrative purposes.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular depicted embodiment could be eliminated. Therefore, the appended claims, and not the detailed description, are intended to particularly point out subject matter regarded to be aspects of the invention, including certain but not necessarily all of the aspects and alternatives described in the detailed description.

Figure 2:
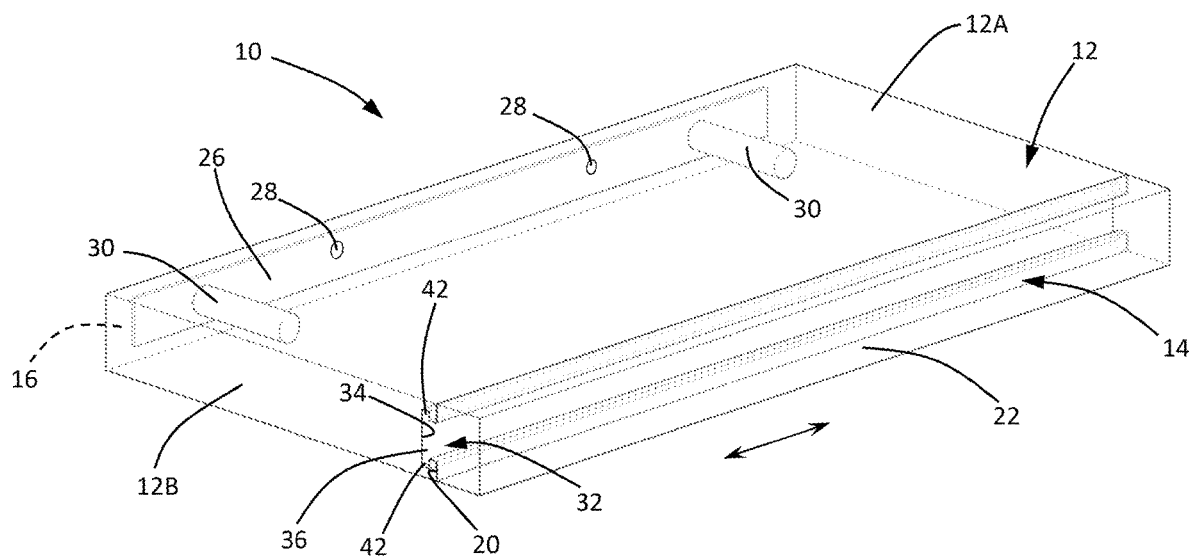
FIG. 2 schematically represents the shelf of FIG. 1 representing the shelf as translucent or transparent to reveal features of the shelf that are within or behind the shelf as viewed in FIG. 2.
Figure 3:
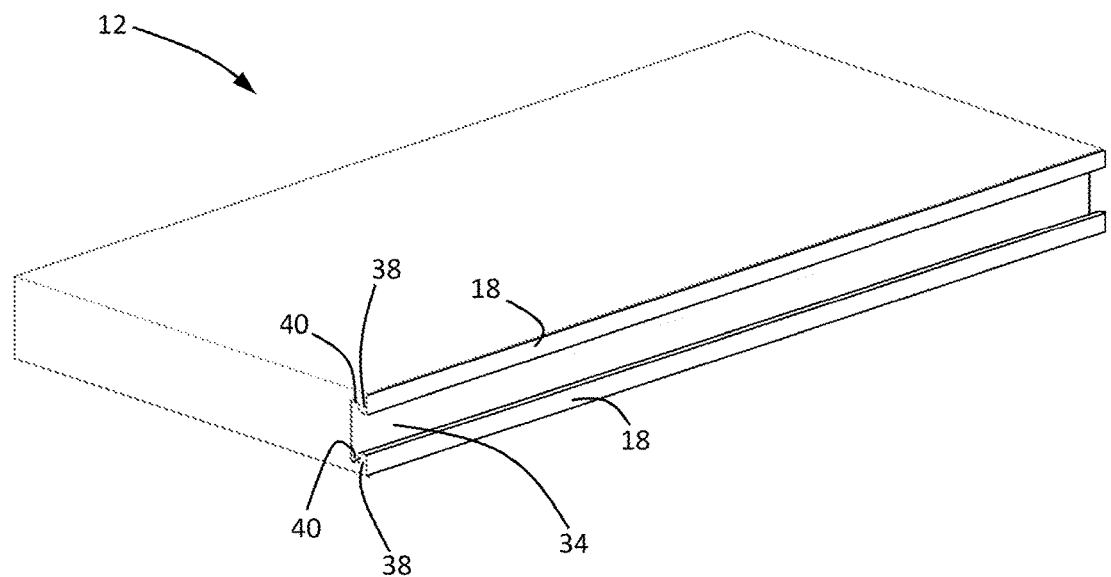
FIG. 3 schematically represents a base member of the shelf of FIGS. 1 and 2.
Figure 4:
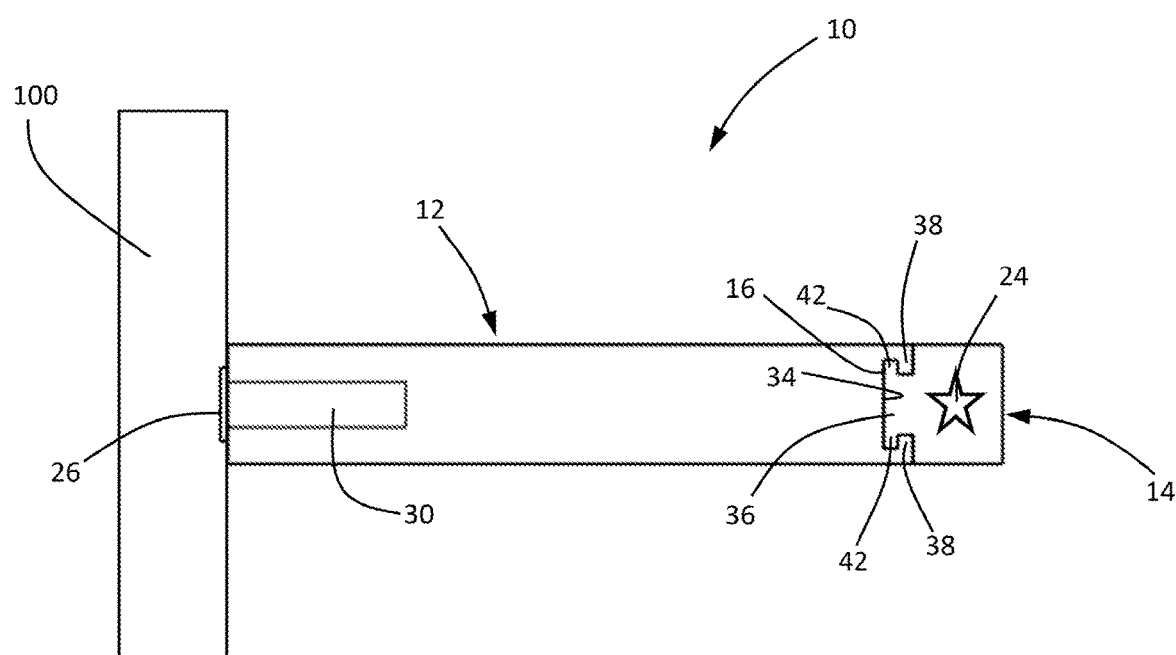
FIG. 4 schematically represents a cross-sectional view of the shelf of FIGS. 1 through 3.
Figure 5:
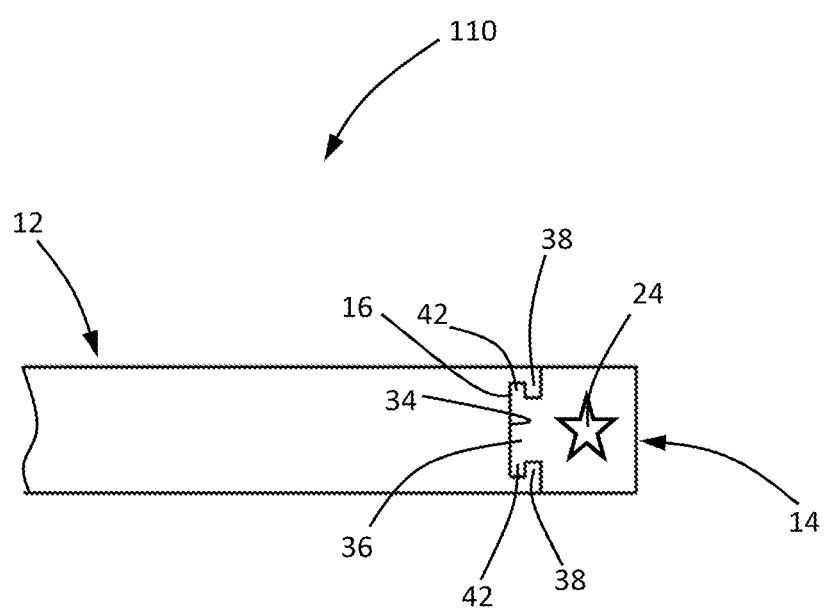
FIG. 5 schematically represents a cross-sectional view of an article in accordance with certain aspects of the invention.

FIGS. 1 through 5 schematically represent a nonlimiting embodiments of articles, including a shelf 10 and a second article 110, for example, podium, table, etc., and components thereof that are adapted to be placed on or mounted to a support surface, an example of the latter being a wall 100 as represented in FIG. 4. To facilitate the description provided below of the embodiment(s) represented in the drawings, relative terms, including but not limited to, "proximal," "distal," "vertical," "horizontal," "lateral," "front," "rear," "side," "forward," "rearward," "top," "bottom," "upper," "lower," "above," "below," "right," "left," etc., may be used in reference to the orientation of the shelf 10 as installed on the wall 100 as represented in FIG. 4 or the orientation of the article 110 when oriented as represented in FIG. 5. All such relative terms are intended to indicate the construction and relative orientations of components and features of the articles and therefore are relative terms that are useful to describe the illustrated embodiment but should not be otherwise interpreted as limiting the scope of the invention.

The shelf 10 is represented in FIGS. 1 through 4 as comprising a first shelf member 12 and a second shelf member 14. A back side of the first shelf member 12 defines a wall-mounting surface 16 (FIG. 2) of the shelf 10, and a front side of the first shelf member 12 defines a front surface 18 (FIG. 3) of the first shelf member 12. A back side of the second shelf member 14 defines a back surface 20 of the second shelf member 14, and a front side of the second shelf member 14 defines a distal surface 22 of the shelf 10. The front surface 18 of the first shelf member 12 and the back surface 20 of the second shelf member 14 are represented as being planar and parallel to one another. The first shelf member 12 is represented as having upper and lower surfaces (e.g., the upper surface 12A) and lateral surfaces (e.g., the lateral surface 12B) that define the exterior surfaces of the first shelf member 12. In the nonlimiting embodiment represented, the first shelf member 12 is larger in size than the second shelf member 14, and as such the exterior surfaces 12A and 12B predominantly define the exterior surfaces of the shelf 10.

The shelf 10 includes wall mounting hardware (FIG. 2) disposed on the back side of the first shelf member 12 for mounting the first shelf member 12 to the wall 100 or other suitable support surface. The wall mounting hardware is represented as comprising a wall plate 26 secured to the wall-mounting surface 16 of the first shelf member 12, holes 28 in the wall plate 26 by which the wall plate 26 can be removably secured to the wall 100 with appropriate wall-mounting fasteners (not shown), and one or more anchor members 30 that each protrude into the first shelf member 12 through the wall-mounting surface 16 of the first shelf member. The anchor members 30 are preferably though not necessarily received in complementary-shaped cavities or bores that extend into the first shelf member 12 from its wall-mounting surface 16. The anchor members 30 are preferably sufficiently long so as to be able to support the combined weight of the first and second shelf members 12 and 14 when the shelf 10 is secured to the wall 100 with the wall mounting hardware.

The shelf 10 is represented as further including interlocking features 32 that are adapted to removably interlock the first and second shelf members 12 and 14 together. The interlocking features 32 comprise a channel 34 and a rail 36 that are complementarily shaped so that the rail 36 is receivable within the channel 34 to removably interlock the rail 36 with the channel 34. The interlocking features 32 are disposed at the front surface 18 of the first shelf member 12 and the back surface 20 of the second shelf member 14 so that the distal surface 22 of the shelf 10 at the front side of the second shelf member 14 is oppositely disposed from the wall-mounting surface 16 of the shelf 10 at the back side of the first shelf member 12 when the rail 36 and the channel 34 are removably interlocked together. In the particular but nonlimiting embodiment shown, the channel 34 is recessed in the front surface 18 at the front side of the first shelf member 12, and the rail 36 protrudes from the back surface 20 at the back side of the second shelf member 14. Furthermore, the nonlimiting embodiment represents the channel 34 as defining a pair of shoulders 38 that project over the channel 34, creating secondary channels 40 that receive complementary flanges 42 that extend from the rail 36 of the second shelf member 14. The channel 34 and rail 36 are configured so that, as indicated by the double-headed arrow in FIG. 2, the second shelf member 14 must be translated parallel to the front surface 18 of the first shelf member 12 to remove the second shelf member 14 from and install the second shelf member 14 on the first shelf member 12.

FIG. 4 represents a decorative object 24 embedded within the second shelf member 14. According to a preferred aspect of the invention, the second shelf member 14 is formed of translucent and/or transparent materials so that the decorative object 24 within the second shelf member 14 is visible through the second shelf member 14. The decorative object 24 may be a two-dimensional (2D) or three-dimensional (3D) object 24 to provide a decorative effect to the shelf 10. Furthermore, the decorative object 24 is preferably embedded in the translucent or transparent material of the second shelf member 14 so that it is in a fixed position within the second shelf member 14.

The shelf 10 may be provided as a kit that contains any number of the second shelf member 14 equipped similarly to the second shelf member 14 represented in FIGS. 1, 2, and 3 such that the decorative effect of the shelf 10 can be modified by interchanging second shelf members 14 that have different embedded objects 24.

According to another preferred aspect of the invention, the first shelf member 14 may also be formed of translucent and/or transparent materials, in which case (as evident from FIG. 2) the anchor members 30 protruding into the first shelf member 12 are visible through one or more surfaces of the first shelf member 12.

The first and second shelf members 12 and 14 can be formed using a molding operation in which a quantity of liquid material is placed in a mold cavity and then cured. In the case of the second shelf member 14, the decorative object 24 is also placed in the mold cavity so that the decorative object 24 is entirely immersed in the liquid material, such that curing the liquid material to form the second shelf member 14 results in the decorative object 24 being completely embedded within the second shelf member 14.

The translucent and transparent materials used to form the first and second shelf members 12 and 14 may include, but are not limited to, various transparent and translucent polymer materials (e.g., poly(methyl methacrylate) (PMMA)) and glass materials. Although the shelf 10 represented in the drawings comprises shelf members 12 and 14 that are each translucent or transparent, it is within the scope of the invention that the first shelf member 12 could be formed of an opaque material such as metals, ceramics, composites, or woods. In addition, portions of the second shelf member 14 may be opaque or semi-transparent. For example, the second shelf member 14 may include a transparent or translucent window surrounded by an opaque or translucent frame, for example, wood, metal, frosted glass, etc. Furthermore, although the shelf 10 represented in the drawings comprises two shelf members 12 and 14, it is foreseeable that additional shelf members could be assembled to create the shelf 10. For example, an intermediate shelf member (not shown) could be provided with interlocking features on opposite sides thereof for interlocking with the interlocking features 32 of the first and second shelf members 12 and 14 depicted in the drawings.

In FIG. 5, consistent reference numbers are used to identify components that are the same or functional equivalents of components identified in FIGS. 1 through 4. In view of similarities between the shelf 10 of FIGS. 1 through 4 and the article 110 of FIG. 5, the following discussion of FIG. 5 will focus primarily on aspects of the article 110 that differ from the shelf 10 in some notable or significant manner. Other aspects of the article 110 not discussed in any detail can be, in terms of structure, function, materials, etc., essentially as was described for the shelf 10.

FIG. 5 represents the article 110 (as nonlimiting examples, a podium or table) comprising first and second members 12 and 14 in which a decorative object 24 is embedded within the second member 14. The first member 12 may be, for example, an integral front edge portion of a table, podium, or other type of furnishing, which may be directly supported on a floor or placed on an object (such as the legs of a table or the base of a podium) supported on a floor. As with the embodiment of the shelf 10 represented in FIGS. 1 through 4, the second member 14 is formed of translucent and/or transparent materials so that the decorative object 24 within the second member 14 is visible through the second member 14 to provide a decorative effect to the article 110. Furthermore, the decorative object 24 is preferably embedded in the translucent or transparent material of the second member 14 so that it is in a fixed position within the second member 14.

As previously noted above, though the foregoing detailed description describes certain aspects of one or more particular embodiments of the invention alternatives could be adopted by one skilled in the art. For example, the articles 10 and 110 and their components could differ in appearance and construction from the embodiment described herein and shown in the drawings, functions of certain components of the articles 10 and 110 could be performed by components of different construction but capable of a similar (though not necessarily equivalent) function, and appropriate materials could be substituted for those noted. As such, and again as was previously noted, it should be understood that the invention is not necessarily limited to any particular embodiment described herein or illustrated in the drawings.

The invention claimed is:

1. An article comprising:
   a first member having a back side and a front side, the front side of the first member defining a front surface of the first member, the first member comprising a first material that is translucent or transparent;
   a second member adapted to be installed on the front side of the first member to provide a decorative effect to the article, the second member having a back side and a front side, the back side of the second member defining a back surface of the second member, the front side of the second member defining a distal surface of the article, the second member being formed of a second material that is translucent or transparent, the first member being larger in size than the second member such that exterior surfaces of the first member predominantly define exterior surfaces of the article when the second member is installed on the first member;
   a first decorative object completely, immovably, and permanently embedded within the second member and visible through the second material of the second member, the first decorative object being a three-dimensional decorative object that is embedded in the second material of the second member so that the first decorative object is in a fixed position within the second member; and
   a third member adapted to be installed on the front side of the first member to provide a decorative effect to the article, the third member having a back side and a front side, the back side of the third member defining a back surface of the third member, the third member being formed of a third material that is translucent or transparent, the first member being larger in size than the third member such that the exterior surfaces of the first member predominantly define the exterior surfaces of the article when the third member is installed on the first member;
   a second decorative object completely, immovably, and permanently embedded within the third member and visible through the third material of the third member, the second decorative object being a three-dimensional decorative object that is embedded in the third material of the third member so that the second decorative object is in a fixed position within the third member; and
   interlocking features adapted to selectively and removably interlock the first member with the second and third members, the interlocking features comprising a channel and a rail that are complementarily shaped so that the rail is receivable within the channel to removably interlock the rail with the channel, the interlocking features being disposed at the front surface of the first member and the back surface of each of the second and third members so that, when the second member or the third member is installed on the first member, the distal surface of the article at the front side of respectively the second member or the third member is oppositely disposed from the back side of the first member when the rail and the channel are removably interlocked together;
   wherein the first decorative object is visible through all surfaces of the second member and through the first material of the first article when the second member is installed on the first member;
   wherein the second decorative object is visible through all surfaces of the third member and through the first material of the first article when the third member is installed on the first member; and
   wherein the decorative effect of the article is modified by interchanging the second member and the third member.

2. The article of claim 1, wherein the channel is recessed in the front surface at the front side of the first member, and the rail protrudes from the back surface at the back side of the second member.

3. The article of claim 1, wherein the front surface of the first member and the back surface of the second member are planar and parallel to one another.

4. The article of claim 1, wherein the channel and the rail are configured so that the second member must be translated parallel to the front surface of the first member to remove the second member from and install the second member on the first member.

5. The article of claim 1, wherein the article is a podium or a table.

6. A method of forming the article of claim 1, the method comprising:
   placing a quantity of liquid polymer and the first decorative object in a mold cavity so that the first decorative object is entirely immersed in the liquid polymer; and
   curing the liquid polymer to form the second member and so that the first decorative object is completely, immovably, and permanently embedded within the second member.

7. The method of claim 6, wherein the article is a podium or a table.

* * * * *